US011946620B2

(12) United States Patent
Lange

(10) Patent No.: US 11,946,620 B2
(45) Date of Patent: Apr. 2, 2024

(54) LUMINAIRE

(71) Applicant: Elisabeth Lange, Atlanta, GA (US)

(72) Inventor: Elisabeth Lange, Atlanta, GA (US)

( * ) Notice: Subject to any disclaimer, the term of this patent is extended or adjusted under 35 U.S.C. 154(b) by 0 days.

(21) Appl. No.: 18/198,599

(22) Filed: May 17, 2023

(65) Prior Publication Data

US 2023/0375160 A1 Nov. 23, 2023

Related U.S. Application Data

(60) Provisional application No. 63/342,725, filed on May 17, 2022.

(51) Int. Cl.
*F21V 14/04* (2006.01)
*F21V 7/05* (2006.01)

(52) U.S. Cl.
CPC ................ *F21V 14/04* (2013.01); *F21V 7/05* (2013.01)

(58) Field of Classification Search
CPC ........... F21V 7/05; F21V 14/04; F21V 14/045
See application file for complete search history.

(56) References Cited

U.S. PATENT DOCUMENTS 4,409,646 A * 10/1983 Baliozian ............... G03B 15/02 362/17

* cited by examiner

*Primary Examiner* — Sean P Gramling
(74) *Attorney, Agent, or Firm* — Asgaard Patent Services, LLC; F. Wayne Thompson, Jr.

(57) ABSTRACT

Disclosed is a luminaire configured to provide for an adjustable lighting profile. The characteristics that define the lighting profile include the angle and intensity of light emitted from the housing of the luminaire. An example luminaire comprises: a housing and a light source positioned within the housing. The housing defines two lateral side openings and a front opening through which light emitted by the light source can escape; the housing includes a plurality of interior reflective surfaces that redirect light emitted by the light source; and the housing includes an adjustable reflector that is rotatably coupled to the housing and used to selectively block at least a portion of the front opening.

5 Claims, 6 Drawing Sheets

LUMINAIRE

CROSS-REFERENCE TO RELATED APPLICATION(S)

This application claims the benefit of U.S. Provisional Application Ser. No. 63/342,725, filed on May 17, 2022, the entirety of which is incorporated herein by reference.

TECHNICAL FIELD

This disclosure relates to implementations of a luminaire.

BACKGROUND

A luminaire is a lighting unit that includes a fixture body, or housing, and one or more electric lamps. The fixture body is often decorative. The electric lamp may comprise a socket and a removable incandescent light bulb or LED light bulb. Luminaires can include other features such as reflectors for directing light. The reflectors may be used to facilitate adjustments to the angle and intensity of light emitted by the luminaire. Such designs are considered to have an adjustable lighting profile.

Accordingly, needs exist for the luminaire disclosed herein. It is to the provision of a luminaire configured to address these needs, and others, that the present invention is primarily directed.

SUMMARY OF THE INVENTION

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a luminaire configured to provide for an adjustable lighting profile. The characteristics that define the lighting profile include the angle and intensity of light emitted from the housing, or fixture, of the luminaire.

An example luminaire comprises: a housing and a light source positioned within the housing. The housing defines two lateral side openings and a front opening through which light emitted by the light source can escape; the housing includes a plurality of interior reflective surfaces that redirect light emitted by the light source; and the housing includes an adjustable reflector that is rotatably coupled to the housing and used to selectively block at least a portion of the front opening.

Another example luminaire comprises: a housing and a light source positioned within the housing. The housing defines two lateral side openings and a front opening through which light emitted by the light source can escape; the housing includes a plurality of interior reflective surfaces that redirect light emitted by the light source; and the housing includes an adjustable reflector having a reflective surface on one side. The adjustable reflector is rotatable relative to the housing to adjust an angular position between the reflective surface of the adjustable reflector and the front opening of the housing. The lighting profile of light emitted by the light source varies as a function of the angular position between the reflective surface of the adjustable reflector and the front opening of the housing.

Yet another example luminaire comprises: a housing, an adjustable reflector, and a light source. The housing comprising a rounded rectangle shaped bottom segment, a rounded rectangle shaped vertical wall segment, a rounded rectangle shaped top segment, and a rounded rectangle shaped glare shield. The glare shield depends from the top segment and is offset from the vertical wall segment by the top segment. The adjustable reflector is rotatably coupled to the bottom segment of the housing. The light source is mounted on the vertical wall of the housing. The housing defines two lateral side openings and a front opening through which light emitted by the light source can escape; the housing includes a plurality of interior reflective surfaces that redirect light emitted by the light source. The adjustable reflector includes a reflective surface on one side, and is rotatable relative to the housing to adjust an angular position between the reflective surface of the adjustable reflector and the front opening of the housing. The lighting profile of light emitted by the light source varies as a function of the angular position between the reflective surface of the adjustable reflector and the front opening of the housing.

BRIEF DESCRIPTION OF THE DRAWINGS

Like reference numerals refer to corresponding parts throughout the several views of the drawings.

DETAILED DESCRIPTION

Figure 1:
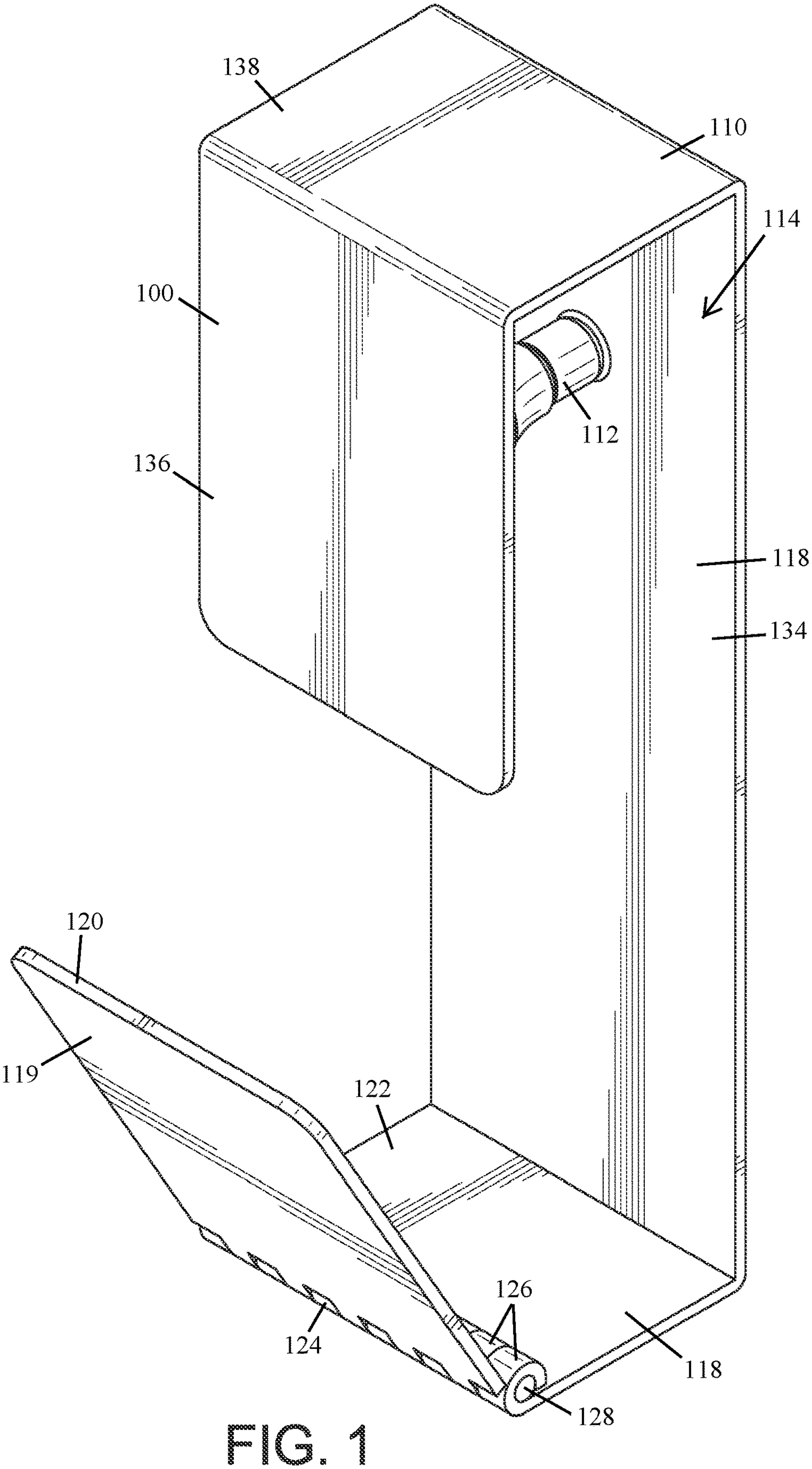
FIG. 1 is an isometric view of a luminaire according to the principles of the present disclosure.
Figure 2:
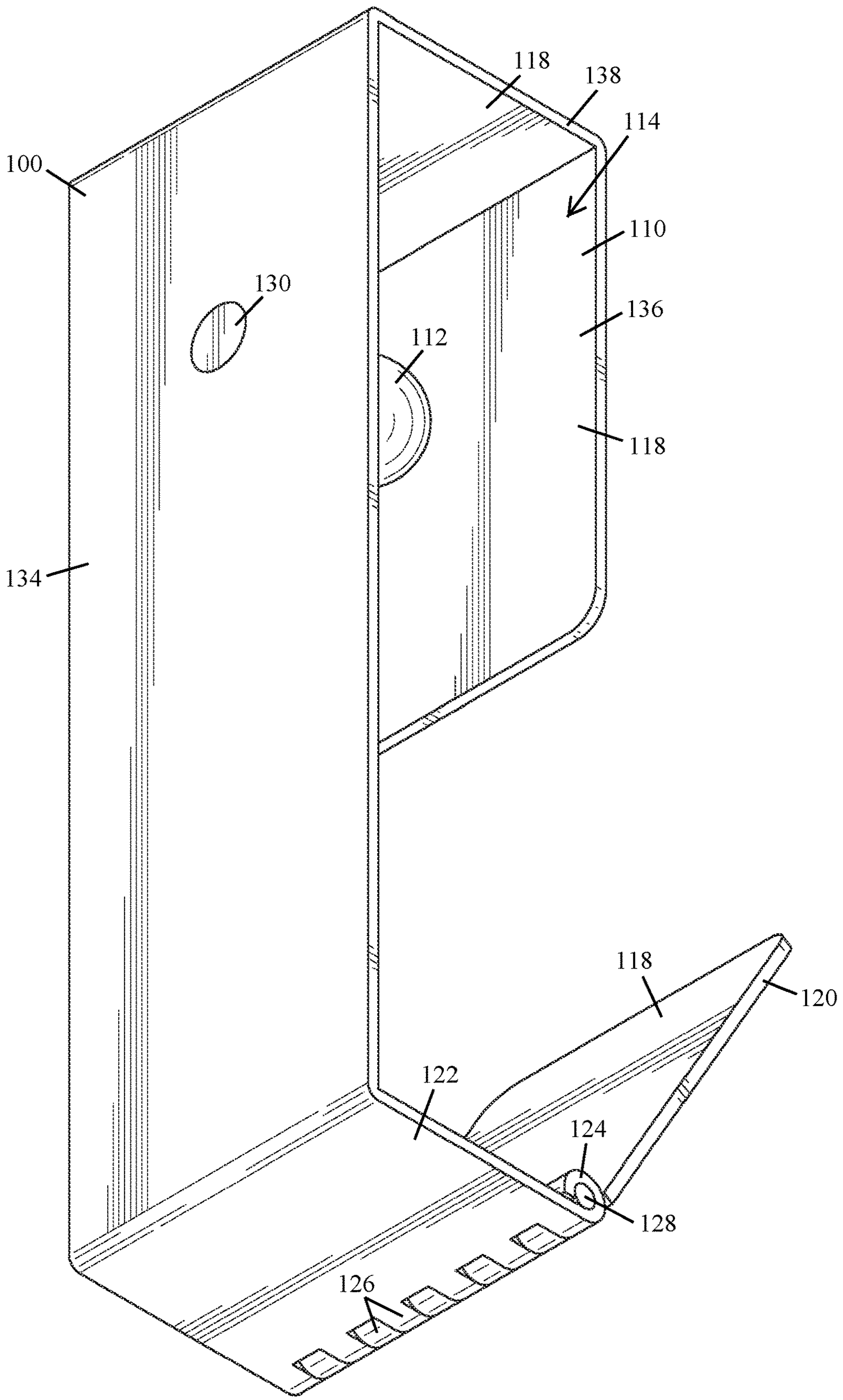
FIG. 2 is another isometric view of the luminaire shown in FIG. 1.
Figure 3:
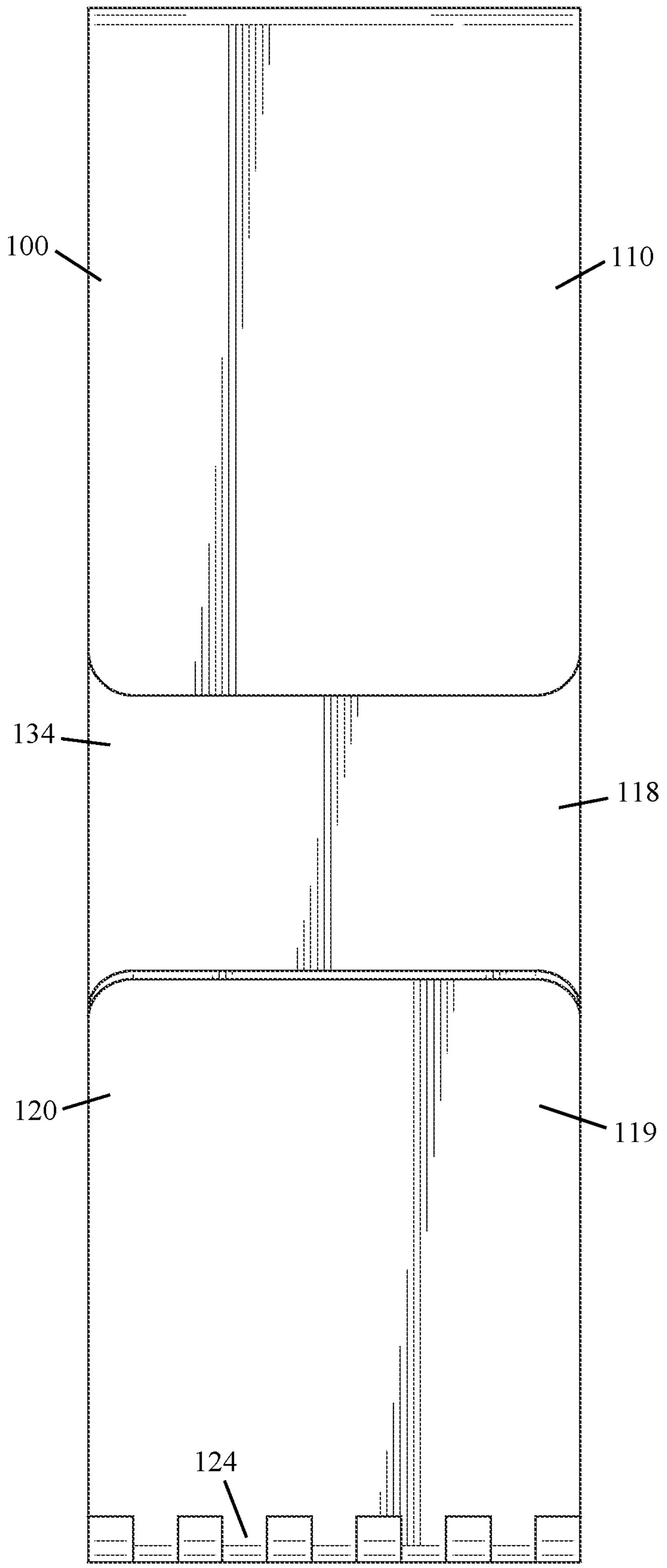
FIG. 3 is a front side elevational view of the luminaire shown in FIG. 1.

FIGS. 1-6 illustrate an example luminaire 100 according to the principles of the present disclosure. The luminaire 100 can be used to provide illumination and is configured so that a user can adjust the lighting profile of the luminaire 100. The characteristics that define a lighting profile of the luminaire 100 include the angle and intensity of light emitted from its housing 110.

As shown in FIGS. 1-6, the luminaire 100 comprises a housing 110 and an electric lamp 112.

The housing 110 defines two lateral side openings 114 and a front opening 116 through which light from the electric lamp 112 can escape. The housing 110 includes a plurality of interior reflective surfaces 118 that redirect light emitted by the electric lamp 112 towards the environment. The housing 110 also includes an adjustable reflector 120, the angle of which may be set by the user of the luminaire 100. As shown best in FIGS. 4 and 6, the adjustable reflector 120 can rotate in the directions indicated by the arrows. The adjustable reflector 120 is used to selectively cover or block, at least a portion of, the front opening 116 of the housing 110. The adjustable reflector 120 includes a reflective surface 118 on one side, and is attached to a bottom segment 122 of the housing 110 by a hinge 124.

The adjustable reflector 120 has opposed major surfaces 118, 119. The adjustable reflector 120 is also planar and generally rectangular. But other shapes are possible, and the adjustable reflector 120 may not be planar.

The example hinge 124 comprises a series of interlocking knuckles 126 held together by a pin 128. However, it should be understood that, another hinge capable of performing the functions of the hinge 124 described herein could be used.

Figure 4:
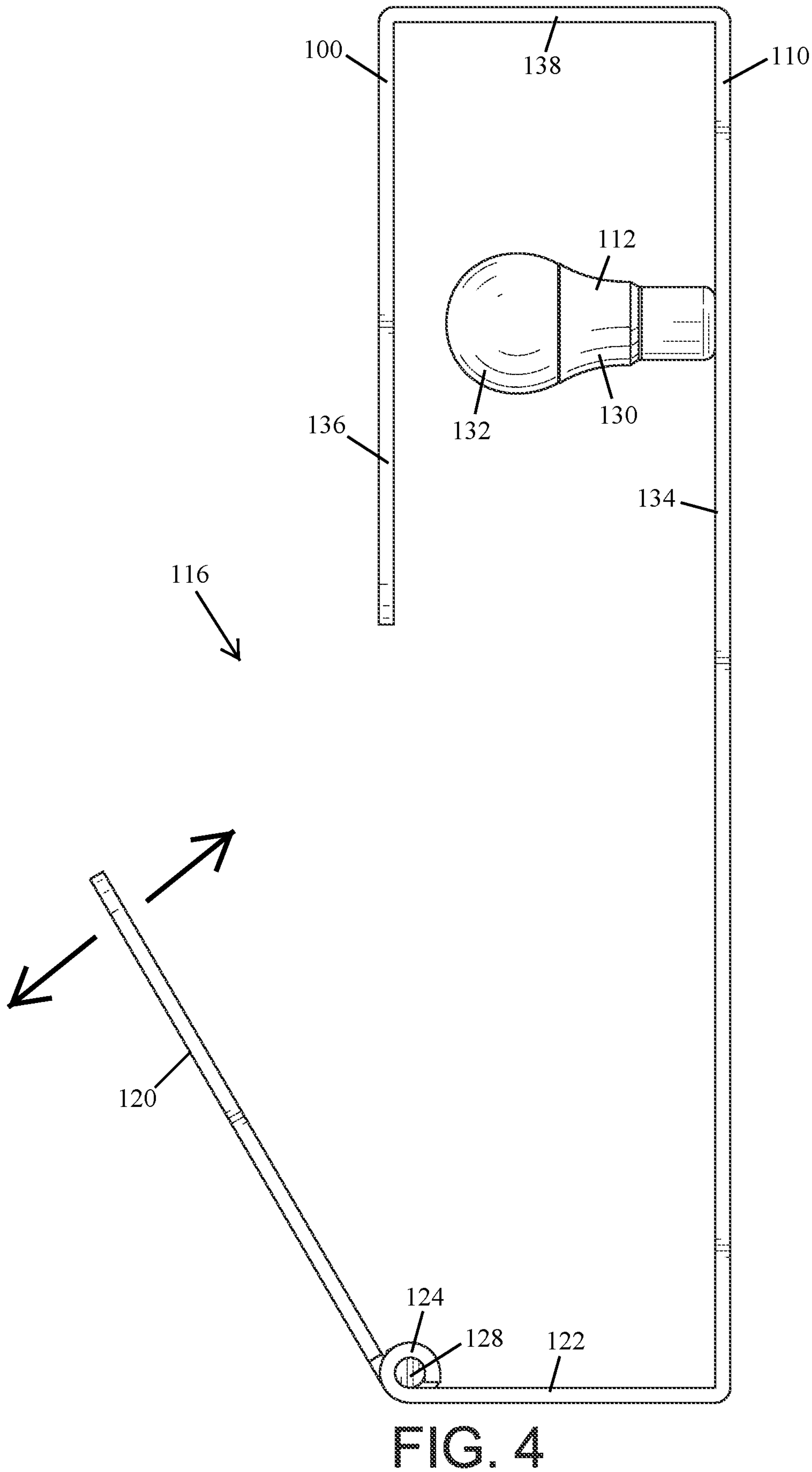
FIG. 4 is a right side elevational view of the luminaire shown in FIG. 1.
Figure 5:
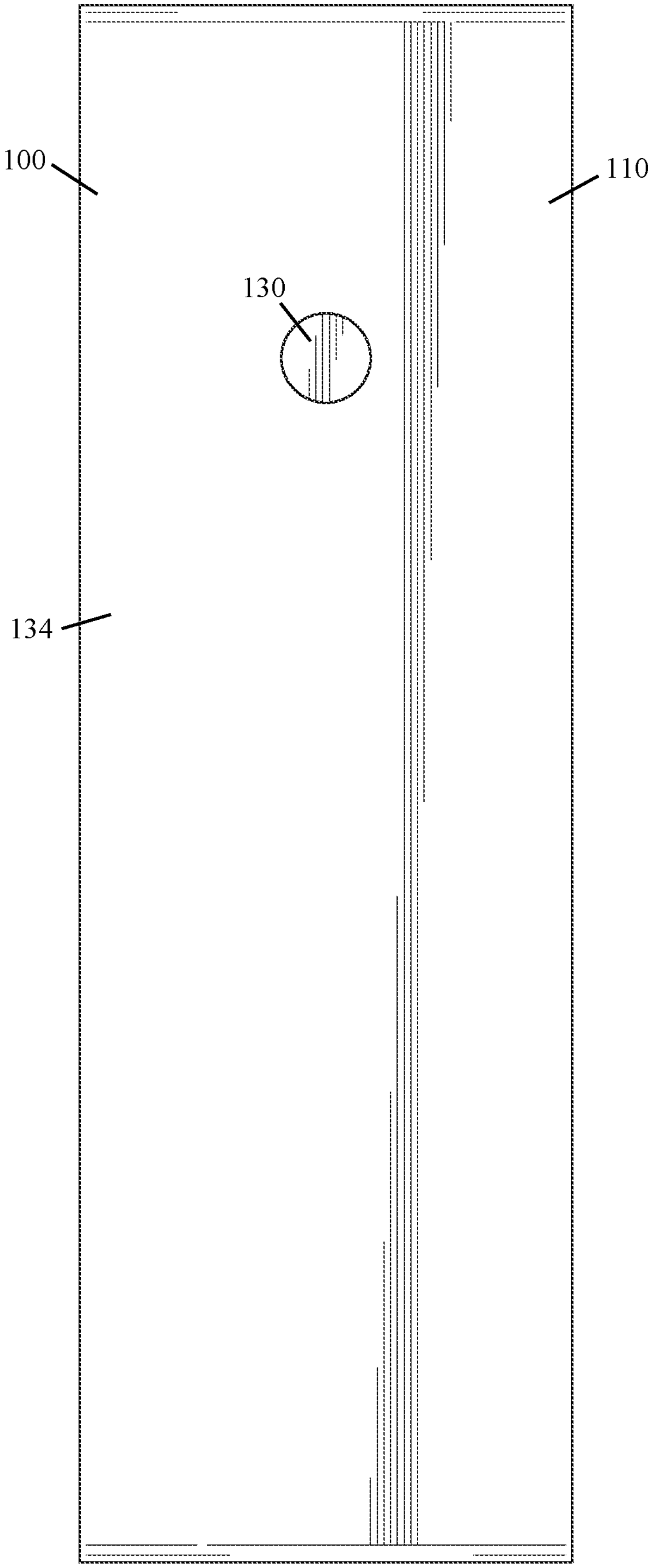
FIG. 5 is a back side elevational view of the luminaire shown in FIG. 1.
Figure 6:
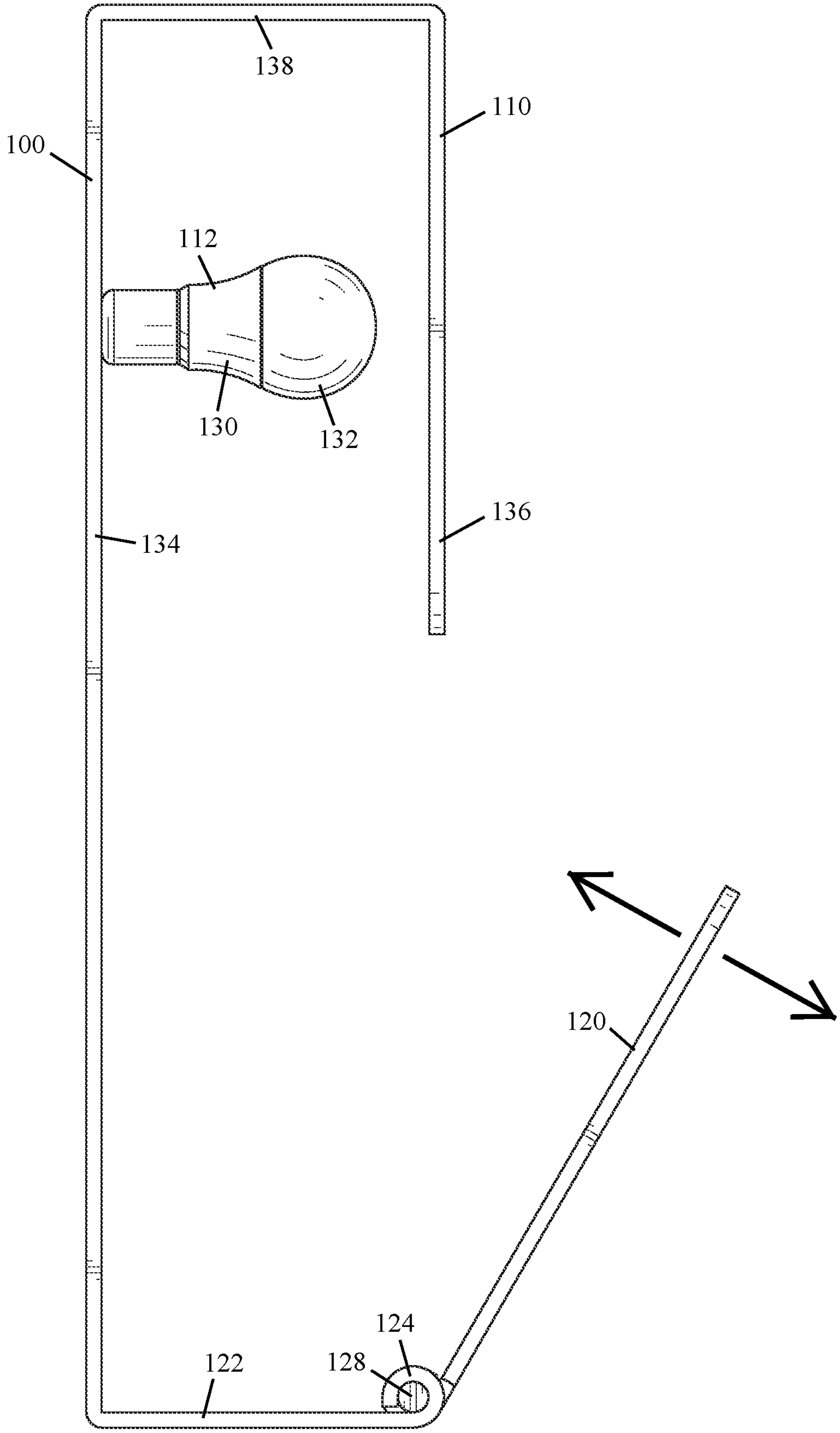
FIG. 6 is a left side elevational view of the luminaire shown in FIG. 1.

As shown in FIGS. 4 and 6, the electric lamp 112 comprises a socket 130 and a light bulb 132. However, in some implementations, the electric lamp 112 could be an LED, or an array of LEDs. The electric lamp 112 can be connected to a power source, such as a wall outlet, by a power cable (not shown). However, in some implementations, an electric lamp powered by one or more batteries could be used instead. As shown best in FIGS. 4 and 6, the electric lamp 112 is partially enclosed by the housing 110. More specifically, the electric lamp 112 is mounted on a vertical wall segment 134 of the housing 110, behind a glare shield 136 depending from a top segment 138 of the housing 110. Consequently, an observer standing in front of the luminaire 110 may be shielded from direct observation of the electric lamp 112.

The bottom segment 122, vertical wall segment 134, top segment 138, and glare shield 136 of the housing 110 may be integrally formed. The bottom segment 122, vertical wall segment 134, top segment 138, and glare shield 136 of the example housing 110 are a single-piece steel alloy construction. However, it should be understood that, the housing 110 could be a single-piece aluminum alloy construction. Though not integrally formed with the other segments (122, 134, 136, 138) of the housing 110, the adjustable reflector 120 is made of the same material.

The exterior of the housing 110 is powder coated, and the interior reflective surfaces 118 are exposed, potentially polished, surfaces of the material from which the housing 110 is fabricated. However, in some implementations, the reflective surfaces 118 could, instead, be reflectors attached to the housing 110.

The luminaire 100 can be mounted to a wall, or other vertical surface. However, it is possible to suspend the luminaire 100 from a horizontal surface or post.

Operation and Use of the Luminaire

The lighting profile of the luminaire 100 can be changed by adjusting the angle of the reflector 120 relative to the bottom segment 122 of the housing 110. More specifically, changes in the lighting profile of the luminaire 100 result from varying the position of the reflective surface 118 on the backside of the adjustable reflector 120 relative to the front opening 116 of the housing 110. Consequently, a change in the position (i.e., angle) of the adjustable reflector 120 effects the angle and intensity of light exiting the luminaire 100 through the front opening 116. It also effects the intensity of light exiting through the lateral side openings 114 of the luminaire 100.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A luminaire comprising:

a housing comprising a rounded rectangle shaped bottom segment, a rounded rectangle shaped vertical wall segment, a rounded rectangle shaped top segment, and a rounded rectangle shaped glare shield, the glare shield depends from the top segment and is offset from the vertical wall segment by the top segment;

an adjustable reflector that is rotatably coupled to the bottom segment of the housing; and a light source mounted on the vertical wall of the housing; wherein:

the housing defines two lateral side openings and a front opening through which light emitted by the light source can escape;

the housing includes a plurality of interior reflective surfaces that redirect light emitted by the light source;

the adjustable reflector includes a reflective surface on one side;

the adjustable reflector is rotatable relative to the housing to adjust an angular position between the reflective surface of the adjustable reflector and the front opening of the housing; and a lighting profile of light emitted by the light source varies as a function of the angular position between the reflective surface of the adjustable reflector and the front opening of the housing.

2. The luminaire of claim 1, wherein the adjustable reflector is planar and generally rectangular.

3. The luminaire of claim 1, wherein the light source is positioned between the glare shield and the vertical wall segment of the housing, and the glare shield is opaque.

4. The luminaire of claim 1, wherein the adjustable reflector is rotatably coupled to the bottom segment of the housing by a hinge, and the front opening is defined between a bottom edge of the glare shield and the hinge.

5. The luminaire of claim 1, wherein the bottom segment, the vertical wall segment, the top segment, and the glare shield of the housing are a single unitary piece of material.

* * * * *